R. L. MARTIN, Jr. & W. W. MACFARREN.
COKE DRAWER.
APPLICATION FILED DEC. 21, 1906.

902,243.

Patented Oct. 27, 1908.
5 SHEETS—SHEET 2.

Witnesses:
E. R. Rodd
Chas S. Lepley

Inventors:
Robert L. Martin Jr.
Walter W. Macfarren
by C. M. Clarke
Their attorney

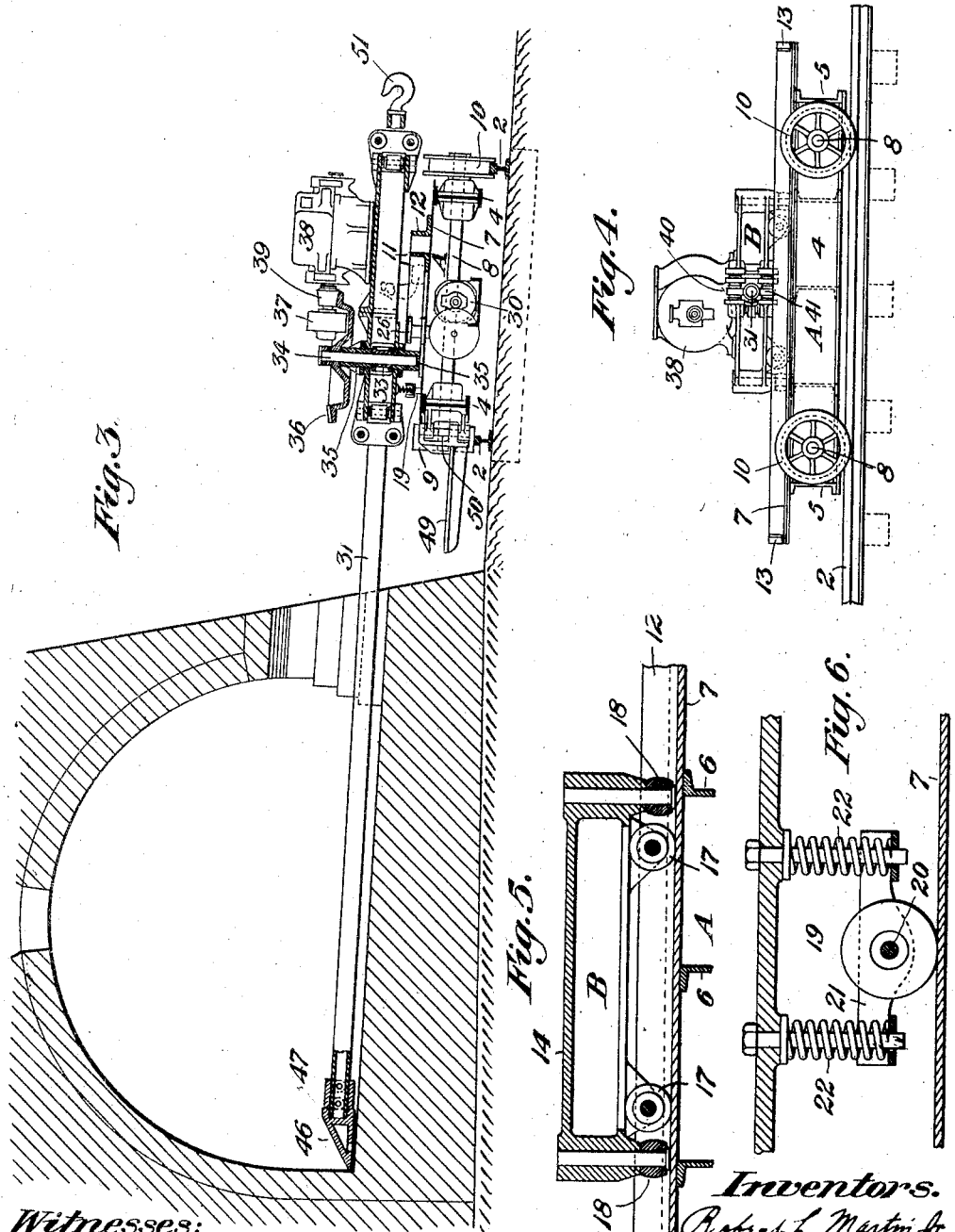

R. L. MARTIN, Jr. & W. W. MACFARREN.
COKE DRAWER.
APPLICATION FILED DEC. 21, 1906.

902,243.

Patented Oct. 27, 1908.
5 SHEETS—SHEET 4.

Witnesses:
E. R. Rodd.
Chas. S. Lepley.

Inventors.
Robert L. Martin Jr.
Walter W. Macfarren
by C. M. Clarke
their attorney

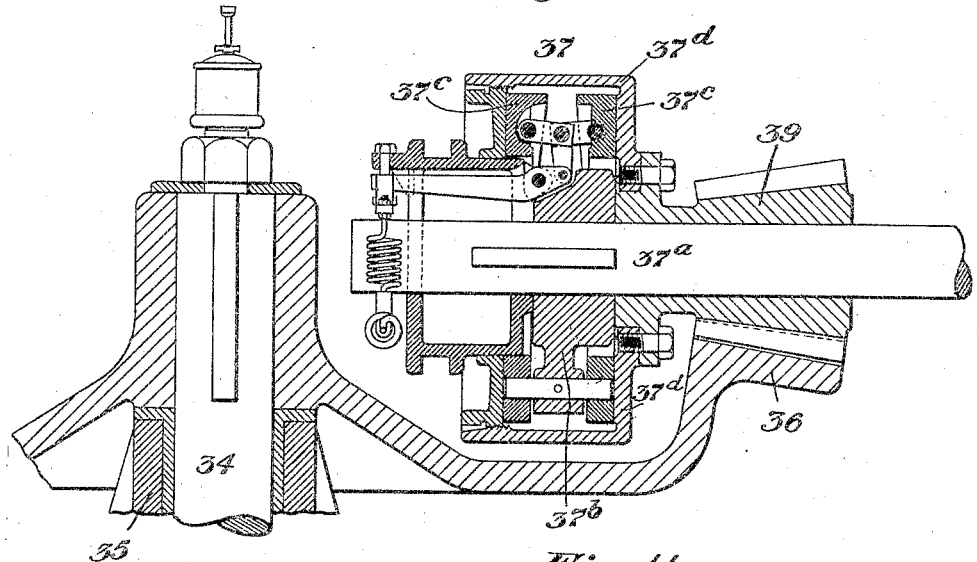
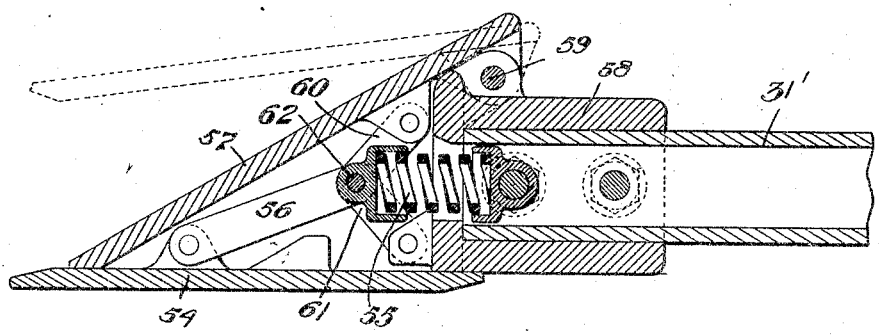
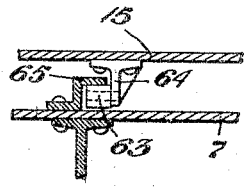

UNITED STATES PATENT OFFICE.

ROBERT L. MARTIN, JR., AND WALTER W. MACFARREN, OF PITTSBURG, PENNSYLVANIA, ASSIGNORS OF THREE-FOURTHS TO SAID MARTIN AND ONE-FOURTH TO SAID MACFARREN.

COKE-DRAWER.

No. 902,243. Specification of Letters Patent. Patented Oct. 27, 1908.

Application filed December 21, 1906. Serial No. 348,896.

*To all whom it may concern:*

Be it known that we, ROBERT L. MARTIN, Jr., and WALTER W. MACFARREN, citizens of the United States, residing at Pittsburg, in the county of Allegheny and State of Pennsylvania, have invented certain new and useful Improvements in Coke-Drawers, of which the following is a specification, reference being had therein to the accompanying drawing.

Our invention refers to improvements in coke drawing apparatus designed for the purpose of extracting coke from the oven, and is particularly designed for use in what is known as the "bee-hive" oven. It has for its objects to provide mechanism by which the operative element of the device may be easily and conveniently located in operative relation to the oven, and to each oven of a series successively; means whereby the operative element may be adjusted laterally to explore the area of the oven independent of its supporting carriage, means whereby the operative element may be inserted and withdrawn from the oven; means whereby said element may be used for the purpose of applying shifting power to cars; means whereby the coke as drawn may be conveyed away to any suitable point of discharge; and means whereby the apparatus may be moved along a track in front of the bank of ovens, together with the various features or details of construction as shall be more fully hereinafter described.

Figure 1:
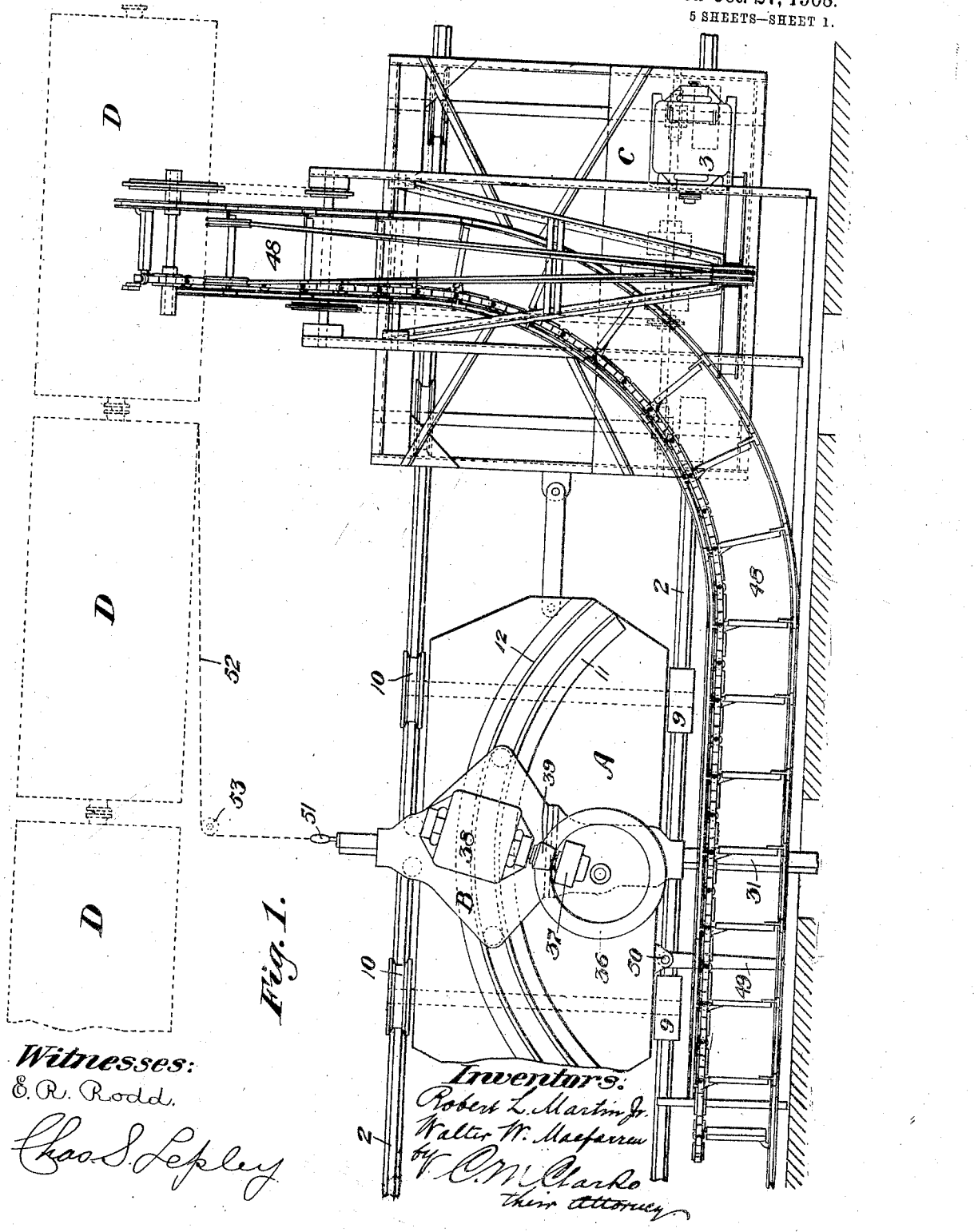
Figure 2:
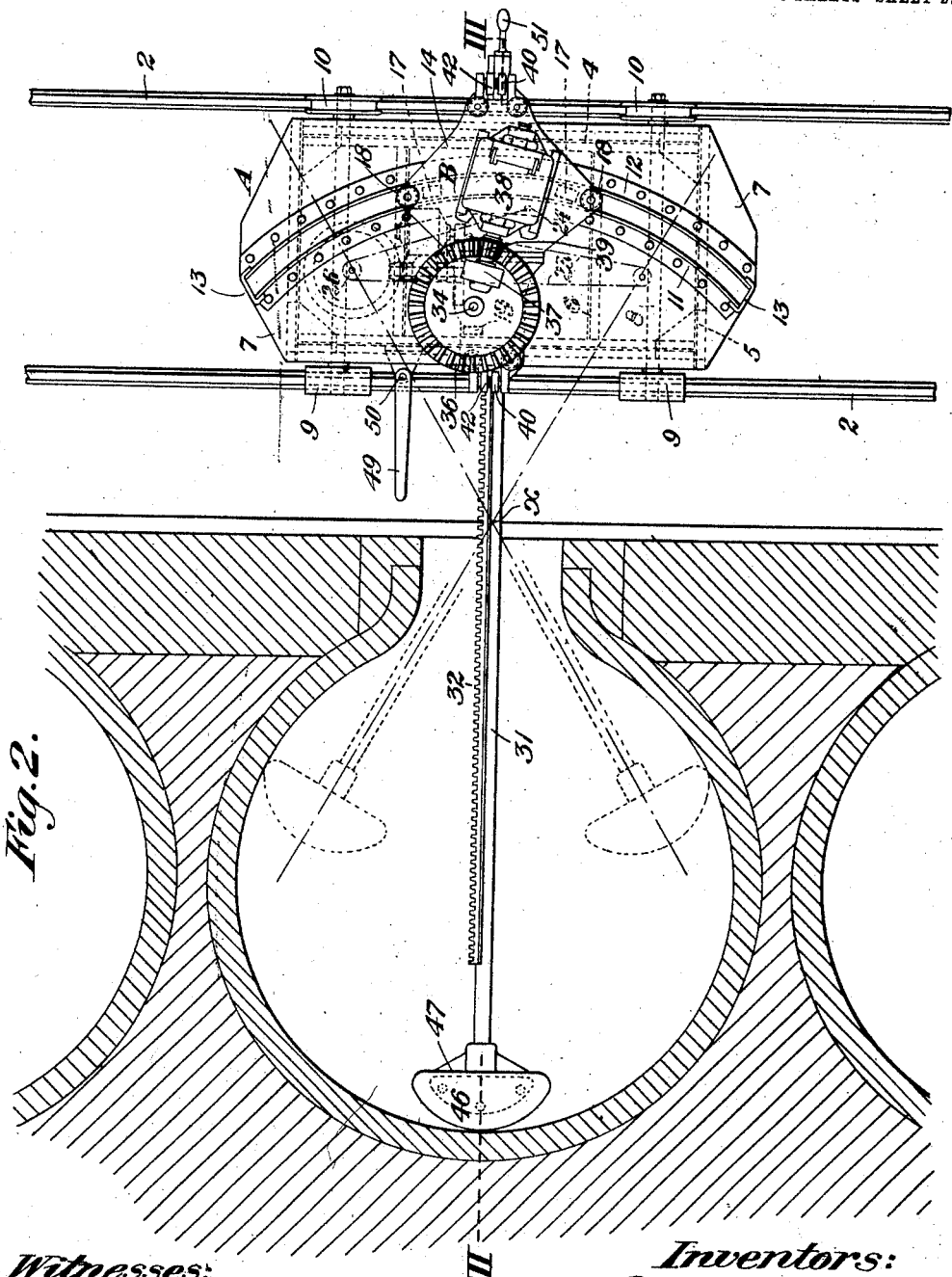
Figure 7:
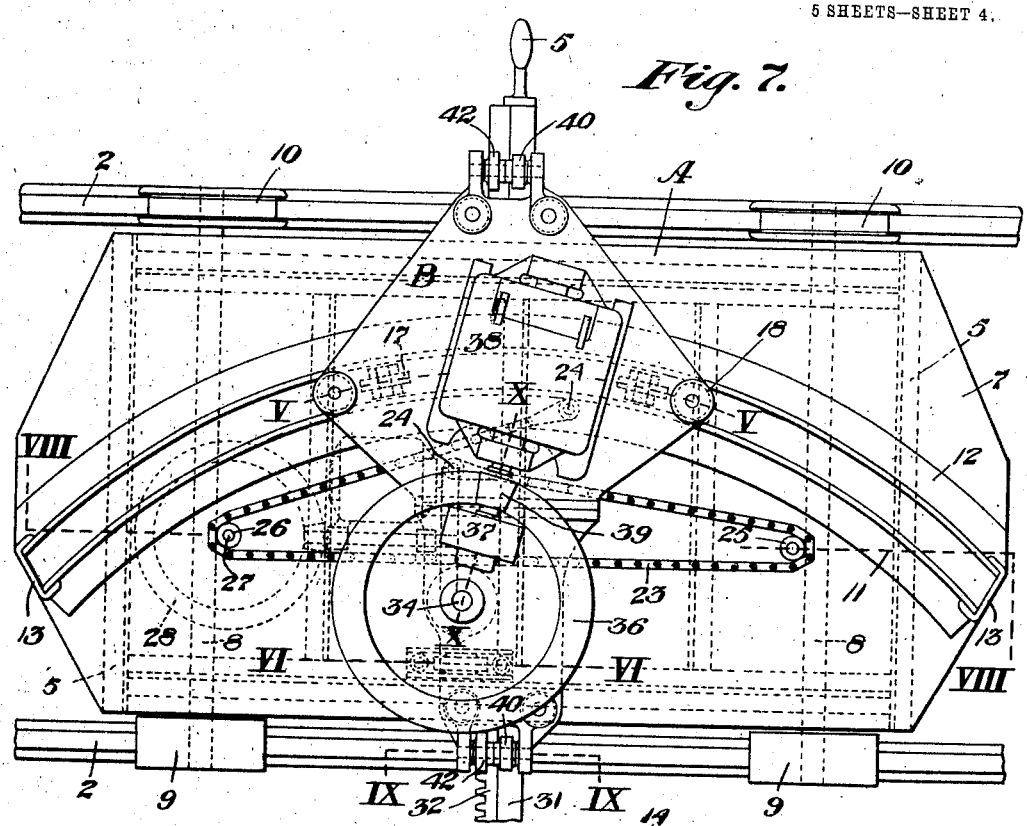
Figure 8:
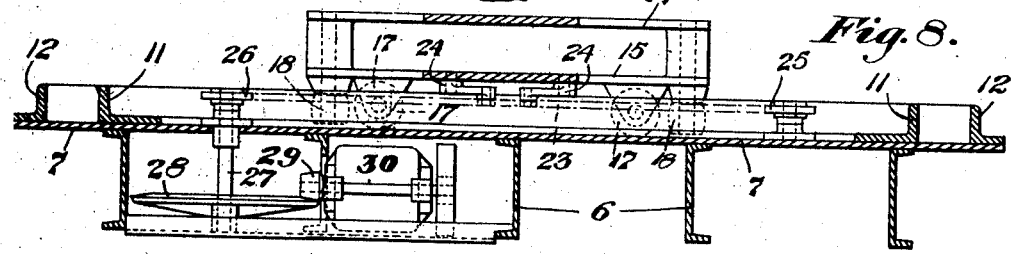
Figure 9:
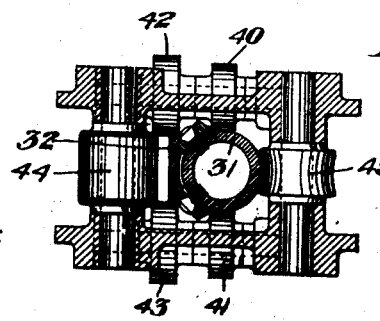

Referring to the drawings, Figure 1. is a general plan view showing the drawing and conveying apparatus assembled in position for operation. Fig. 2. is a plan view of the drawing apparatus on an enlarged scale, showing the extracting element inserted to its full extent in an oven. Fig. 3. is a vertical sectional view indicated by the line III. III. of Fig. 2. Fig. 4. is an end view of the drawing machine, viewed from the rear. Figs. 5 and 6 are enlarged cross sectional detail views on the lines V. V. and VI. VI. respectively of Fig. 7. Fig. 7. is a further enlarged plan view, showing the truck and ram carriage supported thereon. Fig. 8. is a longitudinal sectional view on the line VIII. VIII. of Fig. 7. Fig. 9. is a further enlarged cross sectional detail view on the line IX. IX. of Fig. 7. Fig. 10. is an enlarged sectional detail view through the friction clutch of Fig. 7 on the line X. X. thereof. Fig. 11. is a sectional detail view showing an automatically operative scraper. Fig. 12. is a sectional detail view illustrating mechanism for preventing tipping of the ram carriage.

The apparatus comprises generally a truck A, mounted upon suitable tracks 2, 2, extending along in front of the bank of ovens, and in suitable relation thereto, said truck supporting the extracting element and its laterally adjustable carrier B.

C represents an independent supporting truck or carriage upon which is mounted the conveying mechanism and an independent motor 3 by which both trucks, coupled together as shown, are moved along the track from one oven to the other intermittently and by which motor the conveying mechanism is actuated.

The conveying mechanism, forming a portion of the invention which is the subject matter of a companion application filed herewith, is not specifically described herein, and shall be only generally referred to in order to give a full understanding of the operation and functions of the drawing apparatus, which is the particular subject matter herein set forth.

In designing the truck, the ram carriage, and the other parts of the mechanism, we have utilized as far as possible structural steel, thereby securing great strength, lightness, rigidity and economy. The truck A comprises a main framework composed of structural side and end sills 4 and 5 of channel or other suitable form, with intervening transverse sills 6 and a cover plate 7 or its equivalent, which forms the main supporting structural platform of the truck mounted by suitable bearings on axles 8, 8, having supporting wheels 9, 10, running on tracks 2.

As shown the inner wheels 9 are quite broad and flat merely resting on the top of the inner rail, while the outer wheels 10 are heavily flanged so as to embrace the head of the rail and brace the carriage against the strains in either direction due to the extracting operation in inserting or withdrawing the shovel.

A further advantage of such arrangement of wheels is that any variations as to parallelism of the rails will not materially affect the operation of the apparatus being compensated for by the extra wide faces of the inner wheels 9. The truck A being coupled to the conveyer carriage C as shown, is either pushed or pulled by said carriage and is not therefore necessarily provided with any self-contained propelling motor or mechanism, although it will be understood that if desired the truck A and its extracting apparatus may be employed entirely independent of the conveying mechanism and provided with propelling means.

The ram carriage B comprises a structure of any suitable or convenient form, so arranged that it may be moved laterally to the right or the left, preferably in an arc-shaped track, entirely independent of any pivotal or other guiding or limiting connection with the main truck A, but will, however, generally conform, as to its swinging position, to a theoretical center. Such center is indicated in Fig. 2 at x and is preferably adopted at or about a point in front of the mechanism which will correspond to such a position with relation to the oven that the angle of the ram may be so arranged as to reach all parts of its interior. The position of the ram is thereby controlled solely by the arc-shaped track-way by which the ram carriage is guided or its equivalent, and this is a distinctive and valuable feature of our invention.

The arc-shaped track-way referred to forms an integral portion of truck A, and as shown, is built up from the upper surface thereof by means of front and back angle bars 11, 12, having a radius converging to the center x, either exactly or approximately, secured upon the plate 7 of the ram carriage by rivets or bolts, and preferably extending from one end to the other thereof. The ends of said annular track-way are preferably inclosed by walls 13, 13, to limit the lateral travel of the ram carriage.

As shown in the drawings, the ram carriage B is constructed of upper and lower plates 14, 15, mounted upon casters or rollers 17, 17, at each side of its center arranged to run upon the surface of plate 7, while beyond said casters 17 at each side are vertically arranged guiding rollers 18, 18, mounted on studs below the ram carriage frame and projecting between the curved angles or guides 11, 12. At its forward end the ram carriage is supported upon an additional caster or roller 19 mounted by its shaft 20 in a shoe 21 with interposing cushion springs 22, 22, by which a certain amount of resiliency is provided to compensate for inequalities in the level of the oven floor or vertical deviation of the ram. As thus constructed it will be seen that as the ram carriage is moved to the right or the left it will at all times conform to the curved track-way; will be substantially supported on the flat upper face of the main truck plate 7, and may be adjusted entirely independent thereof by the following means.

23 is a sprocket chain, cable, or other suitable flexible transmitting element connected at its ends 24, 24, to the under side of the ram carriage in any suitable manner as by the construction shown in Fig. 8, and passing around sprocket wheels or sheaves 25, 26, so located as to give the desired range of movement when one of said sprockets is actuated. Positively-actuated sprocket 26 is mounted upon the upper end of shaft 27 extending downwardly through plate 7 or a suitable bearing thereon and is provided with a bevel wheel 28 into which meshes the driving bevel 29 of the transmission gearing of a motor 30, all of said gearing and motor being conveniently mounted below the plate 7 of the truck, and supported thereby, as clearly shown. We prefer to employ friction gearing or other suitable slippage mechanism between the motor 30 and shaft 27, for which purpose the motor pinion and its driven gear may be smooth faced. The advantage of such arrangement is that breakage of the gearing is avoided should the ram carriage be thrown too far to either side, or encounter any resisting obstruction. By this construction the chain 23 may be actuated in either direction and the ram carriage located at the desired position by the motor 30 as will be understood without further description and under the complete control of the operator.

31 is the ram which is preferably in the form of a tube, having secured to it at one side a rack 32 into which meshes pinion 33 on shaft 34, mounted in suitable bearings 35, 35, below and above the main truck construction as clearly shown in Fig. 3. Shaft 34 is provided with a driven bevel wheel 36 of dish form whereby to provide clearance for the friction clutch 37 of the driving motor 38. Said motor is mounted as shown upon the upper side of the ram carriage B, traveling with it, and actuates shaft 34 by means of bevel pinion 39 engaging driven bevel 36 as will be readily understood, whereby to transmit inward or outward movement to the ram 31 as desired. The friction clutch 37, shown in detail in Fig. 10, is so constructed that it will ordinarily transmit the energy of the motor to the pinion 33 to actuate the ram, until an excessive strain is encountered, as for instance by the shovel of the ram coming into contact with the back wall of the oven on forward travel, or by making contact with the door jambs or other obstructions on back travel, also preventing wear or breakage of the gear teeth on reversal of the motor, whereupon slippage will occur and no damage will be done. Also, if the extractor makes contact during its operation with any obstruction sufficient to overcome the transmitting effect of the friction driven mechanism, slippage will occur, allowing the obstruction to be passed as by slewing around of the ram to pass the door jamb.

In the construction shown in Fig. 10 the pinion 39 is loosely mounted on motor shaft 37$^a$ to which is keyed the rotating frame 37$^b$ having frictional engagement by spring-actuated shoes 37$^c$ with the surrounding casing 37$^d$ to which the driving pinion 39 is secured.

The detailed construction of the friction element 37 is not however, particularly essential and does not, *per se*, form any part of the present invention, it being one of several well known constructions which may be used.

The presence of the friction clutch 37 is however highly desirable in that it absolutely prevents the destructive effects of unusual strain, and forms an important element of our invention.

The ram 31 is maintained in alinement by means of upper and lower rollers 40, 41, engaging the ram itself and rollers 42 and 43 engaging the upper and lower sides of the rack 32, said rollers being revolubly mounted in suitable bearings at the front and back of the ram carriage, as clearly shown. Additional bearing rollers 44 and 45, arranged vertically and located in pairs also at each end of the ram carriage, engage the rack face and back of ram 31 as shown, rollers 45 being preferably concaved to conform to the contour of the ram. By this construction it will be seen that the ram will at all times be maintained in alinement with relation to the ram carriage, and will be adjusted thereby to any angle laterally as desired to explore the interior of the oven.

At its forward end the ram is provided with an extracting shovel 46 of any suitable construction to facilitate entrance beneath the coke, being preferably of wedge form, rounded at its front edge, tapering backwardly and upwardly and terminating in an abrupt shoulder 47 adapted to engage behind the coke, and to draw it outwardly when the ram and its shovel or extracting element is withdrawn. Motor 38 like motor 30 is operated by a separate controller, both of said controllers being preferably located on the ram carriage and within easy reach of the operator whose seat may also be likewise mounted on the ram carriage.

48 represents the conveyer of carriage C extending backwardly as shown, to a position in front of the oven door whereby it will receive the coke as drawn on its lower strands, and will convey it outwardly to any desired point of discharge, as for instance into one of a series of cars D. While any convenient conveying mechanism may be employed as stated, it may be briefly explained that the present conveyer consists of a continuous series of paddles or flights mounted upon a universally flexible conveying chain so arranged as to convey the coke by the under strand outwardly, the strands of the upper series returning over the door, downwardly, and again underneath. For the purpose of supporting the rear end of said conveyer the main truck is provided with a laterally extending supporting arm 49 pivotally mounted at 50, and vertically adjustable by means of the threaded pivotal bolt, whereby the conveyer may be supported independent of variations due to curvature of the track or from other causes, and such supporting element is therefore incorporated in the present machine. A further advantage of such support is that it may be turned in along the side of the machine for clearance.

The two carriages A and C may also be uncoupled, and either carriage separately turned on a comparatively short turn-table, due to the fact that each carriage and its parts, *i. e.* the extractor carriage and the conveyer carriage being self-supporting, may be handled entirely independent of the other. Also, the two carriages while still connected, may be easily run around curved tracks to locate them in relation to another bank of ovens, the flexibility of the two carriages being due to the fact that they are not in any manner rigidly connected. Also, either the extractor carriage A or conveyer carriage C may be separately reversed on a short turntable and again coupled up, with ease and facility.

In loading coke from the oven as is usually practiced, a series of cars are brought into suitable relation to the oven by a track-way extending along the edge of the yard, and usually below the level thereof, and for the purpose of shifting the cars, we have provided the back end of the ram with an attaching device consisting of a hook or eye 51 of any suitable construction over or through which may be thrown a rope or chain 52, fed around a snatch block 53 or snub post, to the car which it is desired to move, as indicated in Fig. 1, whereupon motion may be transmitted to the car or to several cars by the ram and its actuating power. This feature of the apparatus is simple and convenient and will be found of great advantage in shifting cars without the necessity of any external power.

In Fig. 11 we have shown a modified construction of shovel adapted to automatically engage the loose coke around the corners of the oven and throw it upwardly and forwardly in front of the shovel. For such purpose the ram 31' is provided with an under plate 54 slidingly arranged and normally held advanced by spring 55 and link 56. 57 is an upper supplemental shovel plate pivotally mounted on the upper side of the ram head 58 and 59 and normally lying down at an inclination upon plate 54 as shown. Toggle links 60, 61, are pivoted to the under side of shovel plate 57 and front of ram head 58 respectively, and to end of link 56 at 62, immediately in front of spring 55, so that when plate 54 makes contact with the oven wall, shovel 57 will be thrown up as indicated in dotted lines. Upon withdrawal of the ram, the shovel will resume its normal position.

In Fig. 12 we have shown a detail view of means for preventing upward tipping of the ram carriage, consisting of one or more rollers 63 depending by bracket 64 below plate 15 of the ram carriage and engaging underneath an angular bearing track 65 secured to the upper face of plate 7 of the ram carriage A. Ordinarily such mechanism will not be necessary except as a safeguard against tipping as the ram carriage is designed to maintain its center of gravity at all times.

The operation of the invention will be readily understood from the foregoing description. Motion being transmitted to the main truck A by means of the conveyer carriage and its motor as described, or in any other suitable way as by traction mechanism mounted on the main truck A itself, and the truck having been positioned in front of the oven to be drawn, the extracting ram is preferably located in the central position as shown in Fig. 2 for initial operation. The coke adjacent to the door having been removed, the ram carriage may then be adjusted laterally either to the right or the left, whereupon the extractor may be inserted to either side and the contents removed therefrom, the operation being continued by locating the extractor at varying angles until the oven is emptied. The construction of the ram beam 31 is such that it will withstand the various strains to which it is subjected and may be considerably deflected as by coming into contact with the jambs of the door without injury, while the arrangement of the parts is such that the center of gravity of the ram carriage and its elements is always within its bearing points in any position of the extractor, thereby preventing tipping, as stated.

It will be understood that any available power mechanism may be employed and that we do not desire to be limited to electric motors, although such are convenient for the equipment and operation of the apparatus where current is available.

The low compact construction of the machine enables it to be used on yards having a normal level of track without necessitating any change in the grade, so that it in no way interferes with the ordinary hand drawing operation as would be the case if grading were required. The operator may at all times see into the oven without stopping, thus enabling him to run the machine with ease and facility.

The invention may be variously changed or modified in construction, design or in different details by the skilled mechanic, but all such changes are to be considered as within the scope of the following claims.

What we claim is:

1. In a coke drawer, the combination of a supporting truck, a laterally movable ram carriage mounted on the truck, an independent motor and gearing mounted on the truck and engaging the ram carriage for moving it laterally, a reciprocating ram mounted in the ram carriage, and means mounted on said carriage for actuating the ram.

2. In a coke drawer, the combination of a supporting truck, a laterally movable carriage mounted on the truck, an independent motor and gearing mounted on the truck and engaging the ram carriage for moving it laterally and for locating it bodily at varying horizontal positions thereon, a reciprocating ram mounted on the ram carriage, and means mounted on said carriage for actuating the ram.

3. In a coke drawer, the combination of a wheeled truck provided with a curved trackway and an independent motor, a laterally movable ram carriage mounted on the truck engaging said trackway and provided with ram guiding devices, shifting means engaging the ram carriage and actuated by said motor, a ram mounted on the ram carriage, and means mounted on the ram carriage for actuating the ram.

4. In a coke drawer, the combination of a wheeled truck provided with a curved trackway and an independent motor, a laterally traveling bodily movable ram carriage mounted on the truck engaging said trackway and provided with ram guiding devices, shifting means engaging the ram carriage and actuated by said motor, a ram mounted on the ram carriage, and means mounted on the ram carriage for actuating the ram, with frictional driving mechanism incorporated therewith.

5. In a coke drawer, the combination with a ram carriage, the ram having a rack, the driving pinion therefor, its shaft and driven gear wheel; of a motor mounted on the ram carriage, its shaft and driving gear, and friction clutch mechanism mounted on the motor shaft for actuating the driving gear and arranged for slippage upon the ram encountering unyielding resistance.

6. In a coke drawer, the combination with a truck provided with an independent motor and a laterally traveling ram carriage geared with said motor, of frictional driving mechanism between the motor and said carriage.

7. In coke drawing and conveying mechanism, the combination with a truck and a superimposed relatively movable ram carriage and ram, of a conveyer carriage coupled to said truck and provided with a conveyer and a propelling motor.

8. The combination with an extracting machine, of a conveyer carriage coupled with the extracting machine provided with conveying mechanism arranged to receive material drawn by the extracting machine and provided with means for actuating the conveying mechanism.

9. The combination with an extracting machine, of a conveyer carriage coupled with the extracting machine provided with conveying mechanism arranged to receive material drawn by the extracting machine and provided with means for actuating the conveying mechanism and for propelling the carriage and extracting machine along the tracks.

10. A portable extracting machine provided with a laterally projecting pivotally mounted conveyer support.

11. A portable extracting machine provided with a laterally projecting pivotally mounted vertically adjustable conveyer support.

12. In a coke drawer, the combination of a truck provided with an independent motor and a curvilinear trackway, a non-pivotally-attached ram carriage guided by said trackway, means actuated by said motor for adjusting the ram carriage, a reciprocating ram mounted on the carriage and provided with an extracting element, and means for actuating the ram.

13. In a coke drawer, the combination of a truck provided with an independent motor and a curvilinear trackway, a non-pivotally-attached ram carriage guided by said trackway, means actuated by said motor for adjusting the ram carriage, a reciprocating ram mounted on the carriage and provided with an extracting element, means for actuating the ram, and yielding power connections between said means and the ram.

14. In a coke drawer, the combination of a truck provided with an independent motor and a curvilinear trackway, a non-pivotally-attached ram carriage guided by said trackway, means actuated by said motor for adjusting the ram carriage, a reciprocating ram mounted on the carriage and provided with an extracting element, means for actuating the ram, and frictional power connections between said means and the ram.

15. In a coke drawer, the combination of a truck provided with an independent motor and a curvilinear trackway, a ram carriage guided by said trackway, means actuated by said motor for adjusting the ram carriage, a reciprocating ram mounted on the carriage and provided with an extracting element, and means mounted on and movable with the ram carriage for actuating the ram.

16. In a coke drawer, the combination with a truck and a relatively movable ram carriage having a ram thereon adapted for angular adjustment with relation to the truck, of means for actuating the ram, means for adjusting the ram carriage, and a separate motor on the truck geared with said ram carriage actuating means.

17. In a coke drawer embodying a truck and a relatively movable ram carriage mounted on the truck provided with a reciprocating ram, means for positioning the ram carriage with relation to the truck, and a separate motor mounted on the truck and geared with said means.

In testimony whereof we affix our signatures in presence of two witnesses.

ROBERT L. MARTIN, Jr.
WALTER W. MACFARREN.

Witnesses:
CHAS. S. LEPLEY,
C. M. CLARKE.